Sept. 18, 1928.
W. C. ESLECK
1,684,952
TRANSMISSION DEVICE FOR MARINE MOTORS
Filed Aug. 11, 1926
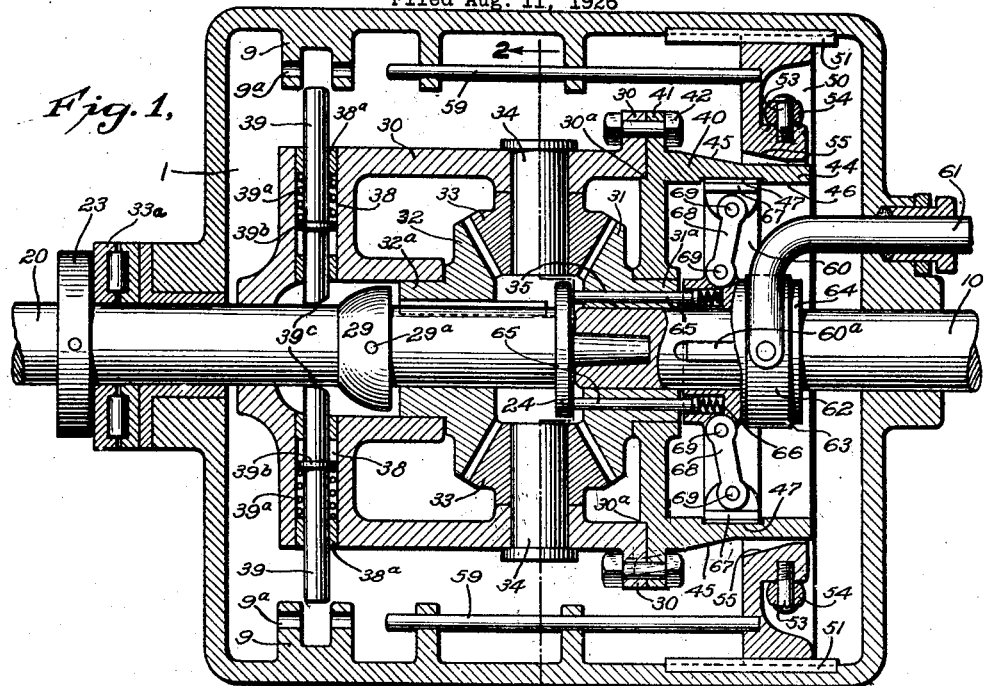
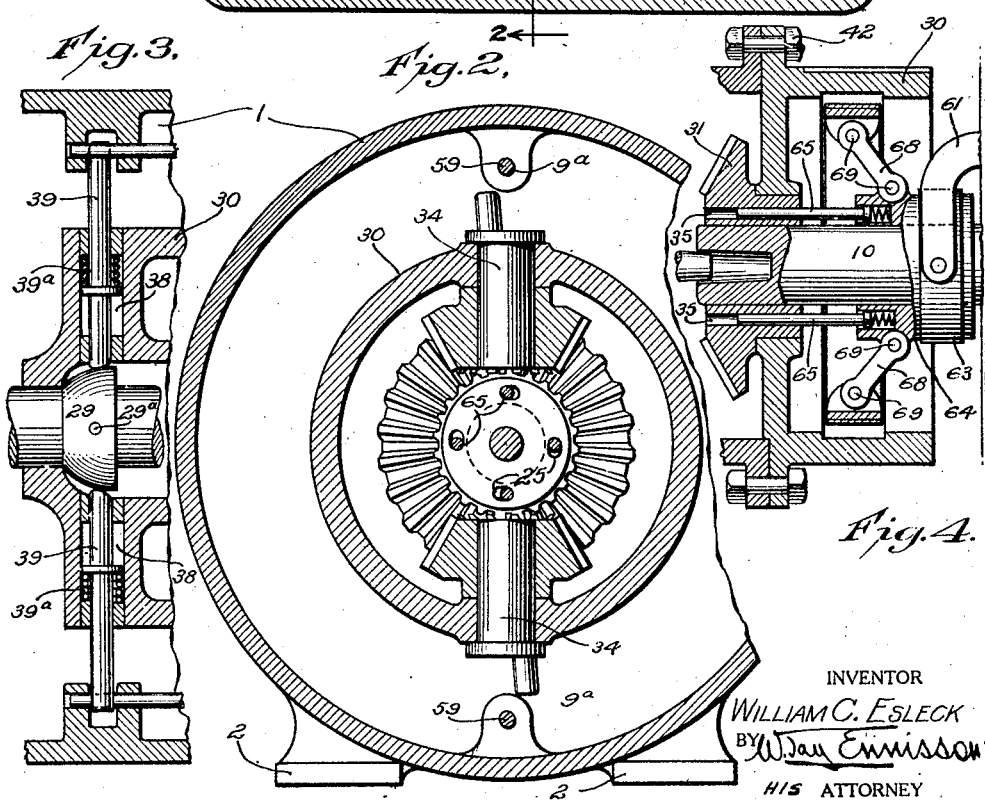
INVENTOR
WILLIAM C. ESLECK
BY W. Jay Ennisson
HIS ATTORNEY Patented Sept. 18, 1928.

1,684,952

UNITED STATES PATENT OFFICE.

WILLIAM C. ESLECK, OF WHITESTONE, NEW YORK.

TRANSMISSION DEVICE FOR MARINE MOTORS.

Application filed August 11, 1926. Serial No. 128,619.

My invention relates to power transmission devices and more particularly to clutch operated driving mechanisms, and has for an object the reinforcement of frictional contacts therein with positive operable connections.

My improvement has been illustrated and described in the present specification in connection with an embodiment adaptable to marine launches and comprises means for rendering positive transmission devices of this class which have heretofore been dependent entirely upon frictional contact.

An object of my invention is to render more effective and dependable transmission mechanisms without materially increasing the expense of their manufacture.

Another object of my inmprovement is to provide a transmission device for marine launches whereby a maximum of efficiency is obtained by a minimum of weight of the essential operable parts thereof.

A still further object of invention is to provide a multiple action clutch mechanism of the class described which may be variously operated by a single hand lever carried to opposite positions and which may thereby be brought into a neutral inoperative position when desired.

Other purposes will appear as the description proceeds, and in the specification and claims, which it is not deemed necessary to set out specifically in this connection.

Generically described the preferred embodiment of my improvements, as illustrated herewith, employs ordinary differentials consisting of four gears suitably mounted in a revoluble casing and a stationary case or box within which the rotatable casing is housed. A motor driven shaft enters both the stationary box and rotatable casing from one direction, a propeller shaft in alignment therewith entering therein from the opposite direction. The driving shaft has keyed thereto what may be termed the actuating gear of the differentials and the other shaft has a screw propeller secured to an end thereof and is operably attached to the oppositely differential.

It is well known that in operating mechanism of the type above described, to effect the respective forward and reverse motions of the vehicle to be driven thereby, the differential case and its included gears are, on the one hand, made to rotate as a unit mechanism together with the driving and propeller shafts which are thereby caused to rotate in unison; or, on the other hand, the gear casing is held stationary by some convenient form of frictional brake device, the gears alone functioning to cause the two shafts to be driven in opposite directions. Frictional clutching means of various types are employed for operably connecting the differential case with the drive shaft for the so-called forward motion.

My improvements of those well known mechanisms and their operation comprise the introduction of positive locking means to supplement the frictional devices both for the rotation of the differential casing and for holding it against rotation, as required.

To this end I employ for effecting both connections, i. e., the rotatable and the frictional brake contacts, two independent, longitudinally slidable clutches. One or these clutches is splined upon the driving shaft and engages the casing by means of an expansible rim adapted to be pressed into and out of contact with an annular inner face thereof as the hub of the clutch is actuated longitudinally of the shaft. The other clutch or brake in the form illustrated is also slidably, that is, non-rotatively, mounted upon the inner wall of the outer case or transmission box, and has an internal tapered face adapted to engage a correspondingly taperd annular face of the rotatable case; and when actuated longitudinally of its bearings this clutch grips the gear case and frictionally holds it against further tendency to rotate.

To the slidable parts of each of these clutches I affix a series of pins designed to function as clutch teeth and which project forwardly in the direction of the engaging motion of the clutch members on which they are respectively mounted, into engaging relationship, the pins of the clutch on the drive shaft into a corresponding series of holes in an enlarged end or head of the propeller shaft and the pins on the brake clutch into the path of one or more radial contact pins upon the differential case.

It will be apparent that if the holes of the propeller shaft do not register with the tooth-pins of the clutch on the driving shaft, when the clutch is first thrown in, those pins which are yieldably mounted in the clutch will of their own action spring into their orifices effecting positive locking engagement therewith upon the clutch slipping to the necessary extent, which in any event need not be more than the distance between holes on the propeller shaft, the pins obviously not being required to function except in case of the actual slipping of the clutch connection.

In the preferred form illustrated the propeller shaft is shown slidably mounted and splined to its differential gear for the purpose, among other reasons which will hereinafter more fully appear, of utilizing the impact of the screw propeller against the water to thrust itself both forward and backward, in the reverse action its outward movement forcing the above mentioned radial pins into position to engage the clutch pins on the outer or braking clutch.

Obviously these radial pins would in a manner perform their primary function if permanently held in their extended positions to engage the clutch or brake pins as the latter move with their clutch into the circular path of the radial pins; but I prefer to have them come into such engaging relationship only after the frictional features of the brake clutch have operated to their full capacity and the revolving case thereby practically brought to a standstill before the radial pins are brought into action.

This result is most conveniently and effectively accomplished in the present preferred embodiment by means of the slidable action of the propeller shaft which is employed, in the manner explained to expand the radial pins only after the gear case has at least operably reduced its momentum, or in its normal operation has ceased entirely to rotate, whereupon the clutch pins will be thrust into position to hold the case from slipping thereafter more than a partial rotation thereof.

When the propeller shaft is thrust inwardly in driving forwardly, by virtue of the inertia of the water reacting against the screw keyed thereon, it carries its orificed head in the direction of the pin-like teeth of the clutch on the driving shaft, which sliding motion of the propeller shaft, as already seen, is not essential or indispensable to effect the locking action of this clutch for the obvious reason that the yielding structure of the clutch pins will permit them to function automatically when the clutch parts slip sufficiently to bring the holes and pins into engaging relationship. But considering the important advantage of having the propeller shaft actuate the locking means in reversal it must also in the nature of things be made to slide forwardly; and furthermore it must be taken into account that the forward thrust of the propeller shaft occurring only after the frictional shaft has already operated, even if imperfectly, has caused the two shafts to rotate in the same direction before the pins are brought into play.

However, in thus employing a sliding connection to permit the longitudinal movements of the propeller shaft to coact in effecting the positive locking actions described it is not desired to limit the scope of my improvement to such details, the object being to effect the positive locking connections described by means of the clutch motions primarily and if it be so desired to dispense with the sliding feature of the propeller shaft altogether, in which instance the means for locking the case to the stationary box will be effected in the manner already described, namely, by dispensing with the slidably operated radial pins and constituting them as rigid studs projecting from the rotatable case as stated.

The accompanying drawings forming a part of this specification are illustrative of a preferred form of my improvement, of which Figure 1 is a diametral sectional view of the rotatable and stationary cases and differential gears therein contained, showing the contiguous ends of propeller and driving shafts;

Fig. 2 is a transverse sectional view on line 2—2 of Fig. 1; and

Figs. 3 and 4 are partial sectional views similar to Fig. 1, showing respective parts in moved positions.

Having reference to the drawings:

The numeral 1 represents an oil tight outer box or case shown cylindrical in the drawings, which contains the essential parts of my improvements as illustrated, and is provided with lugs 2 for making stationary with the launch or other device to which it may be applied. At both ends centrally thereof enter two shafts; at the right hand (see Fig. 1) is shown an end of the crank or driving shaft 10 of an engine or motor, which is designed to rotate continuously so long as the mechanism may be required to be driven in either direction. At the opposite end of the propeller shaft 20 enters the case 1 in axial alignment with the driving shaft 10, these shafts being suitably provided with oil and water tight bearings of which the details of construction have not been deemed necessary to be shown.

Within the box 1 and mounted upon the shafts 10, 20 is a rotatable case 30 which, with the flanged head 40, constitutes a casing that contains four beveled gears constituting the ordinary chain of differentials, so-called; of these the gear 31 is pinned or otherwise fixed to the driving shaft 10, the similar gear 32 oppositely disposed thereto is slidably mounted upon the propeller shaft 20, the oppositely disposed intermediate gears 33 being loosely mounted upon studs 34 projecting inwardly from the opposite walls of the differential casing. The hubs of the gears 31 and 32 have been suitably provided as bearings with annular shoulders 31ª, 32ª, which rest within and impinge against the respective bearings of the casing as shown in the drawings.

The gear containing case, it has been seen, is made preferably in two parts, the case proper represented by the numeral 30 and a head 40 which has the shouldered flange 41 that seats itself into the machined ring 30ª of the case 30 and is firmly and permanently held therein by means of the bolts 42 extending through lugs 30 and the flange 41 of the head member. The member 40 thus rigidly secured to the differential case has attached thereto, preferably integral therewith, a cylindrical extension of flange 44 which has the external or peripheral tapered surface 45 adapted to correspondingly tapered internal face 55 of a sildably mounted brake clutch 50 presently to be described more in detail, and the internal surface 46 having therein the annular groove 47 against the bottom of which is adapted to bear the peripheral surface of the expanding ring 67 of the clutch member 60 next to be considered.

The inner cutch 60 comprises a hub 64 slidably mounted upon the driving shaft 10 by means of a spline 60ª and being actuated by means of a hand lever (not shown) connected by the forked link 61 which is pivotally attached to a ring 62 held within a groove 63 suitably provided therein. Upon the hub 64, loosely mounted upon the pins 69 thereon are the radially disposed levers or links 68 which are in turn attached at their outer ends by means of similar pins 69 to an expanding or split band 67 above mentioned, that at all times rests within the rectangular groove 47, which as has already been seen, is formed within the internal face 46 of the extension 45 of the differential case head 40.

The hub member 64 normally rests in position shown in Fig. 4 when the motor is running idly and the clutch 60 is out of contact, in which case the hub is withdrawn from the plane of the band 67 which as has been seen is held against longitudinal movement by means of the groove 47 formed slightly wider than the band, to prevent frictional contact when the band is held normally out of engagement. As a result of these relatively changed positions of the hub and band radial links or levers 68 as best shown in Fig. 4 are fore-shortened, contracting the split band and thereby releasing its frictional hold upon the clutch head 40 of the case 30; and conversely when the hub of this clutch is thrust to the left, as shown in Fig. 1, the band will be expanded and the frictional contact between that member and the casing will be made, and the motive power thereby transmitted from driving shaft 10 to propeller shaft 20, in the well known manner of this type of transmission.

In order, however, to make the above described clutch contact which operates the propeller more effective and dependable I provide a positive action to follow up and co-act with the frictional means which, in the form illustrated, is provided by mechanism comprising a series of slidable pins 65 projecting from the inner face of the hub member 64 and extending through guiding orifices 35 in the hub of the actuating bevel gear 31. The pins are made sufficiently long to project beyond the inner face of the gear 31 and the end of the driving shaft 10 so as to enter openings 25 in the head 24 of the propeller shaft 20, and are yieldingly held in such operable position by means of the springs 66 held against the enlarged ends 66ª on the pins.

Thus it is provided that when the clutch 60 is thrown into frictional contact to start the propeller to drive the launch in a forward direction, the action of the propeller will thrust forward the shaft 20 to which it is attached until stopped by the oppositely disposed driving shaft 10, the openings 25 therein receiving the ends of the clutch pins 65; or, if the pins 65 are not in register with the openings to which they relate when the two shafts meet, the face 24 of the shaft will press the pins inwardly against the action of their springs 66 so long as no slipping of the clutch occurs. In such case there is obviously no need for the functioning of the pins to make a non-slip connection, but when slipping begins if it does take place the water pressure upon the revolving screw propeller having thrust it forward brings the holes 25 by such slipping action into correspondence with the pins 65 and the positive connection therebetween will immediately ensue and continue until released by action of the operator.

The clutch action last above described is called into play for propulsion ahead wherein the gear case and the differential gears contained therein rotate as a unit, the gears not functioning independently as such. For reverse motion the gear case is held stationary while the gears perform in the usual manner of differentials. To accomplish this result, following the usual method the case is held by a brake device depending entirely upon frictional means for holding the case from rotation. In this action also, as in connection with the forward motion, I introduce a positively acting element which will now be described more fully in its structural detail.

I employ a sliding type of brake-clutch 50 having tapered contacts carried into and out of engagement by a sliding motion upon its peripheral base or bearing against the inner face of the stationary box 1. The splines 51, preferably two in number and oppositely placed, are suitably disposed upon the bearing internal surface of the box 1 in slidable engagement with the clutch, preventing rotatable movement thereof as it impinges by lateral movement upon the case 30. Upon the periphery of the hub of the clutch 50 is a forked link or lever 54 swivelly attached thereto by means of the pivot pins 53 (see Fig. 1). The member 54 may be a fulcrumed hand lever, or a forked link attached to a hand lever (not shown in the drawings) whereby the clutch 50 may be slid longitudinally of its bearing to bring its internal beveled face 55 into frictional engagement with the surface 45 of the head 40 of the case 30, whereby the case 30 may be held from rotatable movement within the box 1 by means of whatever pressure shall be applied by the operator through a manually controller lever. This application of pressure often proves insufficient to prevent objectionable slipping of the brake and it is one of the features of my improvement to provide a locking device to eliminate the defect.

To this end I employ one or more, preferably two, radial pins 39 slidably mounted in tubular bearings 38 suitably provided in the head of the gear case 30, being confined therein by the similar bushings 38ª. The pins 39 have each a rounded end, as at 39ᶜ, that is adapted to engage the beveled face of the collar 29, pinned to the propeller shaft at 29ª, when the propeller is carried outwardly as when made to rotate in reverse, that is, when the gears are thrown into action by operation of the brake clutch 50 in bringing the gear case to a stop. The pins 39 having been thrust outwardly by the camming action of the collar 29, in the manner described, the outer ends thereof have thereby been brought into position to pass through the bifurcation of the bosses 9, as shown in Fig. 3, which have provided transversely therethrough the guide orifices 9ª (Fig. 2) into which extend the ends of the sliding rods 59 carried by the clutch 50 and which, when the clutch is moved in the direction of the bosses 9, carry the far ends thereof into the path of the radial pins 39 to forestall, by a positive locking contact between the pins 39 and rods 59 (see Fig. 3) slipping that will take place in the event the brake clutch 50 should fail to make a secure non-slip frictional connection when the mechanism has been thrown into reverse.

The radial pins 39 are held normally in contact with the shaft 20 and the collar 29 thereon by means of the coil springs 39ª pressing against the shoulder, or collar 39ᵇ, which springs should have sufficient strength to forestall any tendency of the pins 39 to expand by action of centrifugal force and engage the rods 59 previous to the action of the propeller in carrying the shafts 20 from the shaft 10.

Upon the shaft 20 pinned or otherwise secured thereto is provided a collar 23 which impinges upon a disk head 33ª which forms the outer member of a roller bearing device mounted upon the end of the box 1, as shown in Fig. 1. The collar 23 is so placed upon the shaft as to receive the entire impact of the inward thrust of that shaft at a point immediately adjacent the oppositely disposed end of the shaft 10 but not in actual contact therewith. The opposite face of the thrust collar 23 will in like manner impinge against a similar roller bearing (not shown) that may be supported upon the framework of the launch or otherwise to limit the movement of the head 24 of the shaft to prevent violent contact thereby against the gear 32.

I have shown lever connections for operating the two clutches, which are the rod 61 by means of which the clutch 60 is slidably actuated upon the driving shaft and the forked lever 54 whose ends only are shown attached to the hub portion of the outer clutch 50, it not having been deemed necessary to show the hand lever which operates them. Such manually controlled means, however, may obviously consist of a single hand lever pivotally supported to the frame to be alternately thrown into either of two opposite positions forward and back; the forward position, for example, for operably connecting the driving clutch 60 and simultaneously releasing the other clutch, and the rearward position for throwing the brake clutch into gripping action while releasing the driving clutch; such shifting lever when brought into an intermediate point between the extreme positions mentioned will thereby hold both clutches free from their operable contacts.

Furthermore, it will be understood that the particular type of clutch employed either for forward or reverse motion is not in the form shown deemed essential to the working of my invention, it being required only in any event to have an operable portion of the respective clutches movable longitudinally, the one on the drive shaft, the other on the gear enclosing casing, so as to coact with the similar movement of the respective pin tooth series for locking those clutches in the manner described. This last mentioned form of construction, namely, having the pins supported directly upon the body of the clutch, obviously simplifies the mechanism and is accordingly adapted as a preferred form of the specified details referred to; otherwise any efficient type of frictional clutch may be employed without departing from the spirit of my invention.

I claim:

1. In a power transmission device with differential reverse gears, a case operably mounted within, an actuating shaft entering said case and having pinned thereto one of said gears; a propeller shaft having one end slidably entering said case in axial alignment with said actuating shaft and having another of said gears splined thereon; a clutch having a longitudinally movable hub splined upon said actuating shaft and a divided band expansively supported thereon and adapted to be actuated into frictional contact with said case by sliding the clutch in the direction thereof; pins in said hub parallel to said actuating shaft and extending beyond the end thereof when said hub has been carried in the direction thereof; orifices disposed in the end of said propeller shaft and adapted to receive said pins when the propeller thrusts its said shaft in the direction thereof.

2. In a power transmission device having differential gears, an actuating shaft keyed to one of the gears thereof and a propeller shaft slidably mounted in said device in axial alignment with said actuating shaft and splined to another of said gears; a friction clutch to rotate said differential gears as a unit; pins in said clutch; openings in an end of said propeller shaft adapted to receive said pins when the propeller shaft is slidably actuated; and manual means for moving said pins into engaging position with the openings in said propeller shaft.

3. In a power transmission device for marine motors having a case containing differential gears, an actuating shaft keyed to one of said gears; a slidable propeller shaft in alignment with said actuating shaft splined to another of said gears; frictional clutching means for operably connecting said case to rotate with said actuating shaft; and positive locking means coacting with said slidable propeller shaft for supplementing said frictional connecting means.

4. In a power transmission device for marine motors having a case containing differential gears, an actuating shaft keyed to one of said gears; a propeller shaft in alignment with said actuating shaft splined to another of said gears; frictional clutching means for operably connecting said case to rotate with said shaft; and positive locking means for supplementing said frictional connecting means, and means for operating both the frictional and positive means.

5. In a power transmission device for marine motors having a case containing differential gears, an actuating shaft keyed to one of said gears; a slidable propeller shaft in alignment with said actuating shaft splined to another of said gears; frictional clutching means for operably connecting said case to rotate with said shaft; and positive automatic locking means coacting with said slidable shaft for supplementing said frictional connecting means.

6. In a power transmission device for marine motors having a rotatable case containing differential gears, an actuating shaft keyed to one of the gears thereof; a propeller shaft in alignment with said actuating shaft and splined to another of said gears; a stationary box containing said case; frictional means for operably connecting said case to rotate with said actuating shaft; automatic locking means coacting with said frictional means between said shaft and case; frictional means for preventing said case from rotating and positive automatic locking means coacting therewith to supplement said frictional means.

7. In a power transmission device for marine motors having a case containing differential gears, an actuating shaft keyed to one of said gears; a propeller shaft in alignment with said actuating shaft operably attached to rotate with another of said gears; frictional clutching means for connecting said case rotatably to said actuating shaft; positive locking means supplemental to said frictional means; and single means for operating both the frictional and locking means.

8. In a power transmission device for marine motors having a stationary box and a rotatable case therein containing differential gears, on actuating shaft keyed to one of said gears; a propeller shaft in alignment therewith attached to another of said gears and rotatable therewith; frictional clutching means for operably connecting said case to rotate with said actuating shaft; frictional clutching means for holding said case against rotation relatively to said box; and separate positive locking means for supplementing each of said frictional means.

9. In a power transmission device for motors having a non-rotatable box and a rotatable case therein, differential gears in said case; an actuating shaft keyed to one of said gears and a propeller shaft in alignment therewith attached to another of said gears; manually controlled separable frictional means for rotating said case within said box and for preventing the rotation thereof; and synchronously acting locking means for supplementing said frictional means.

10. In a power transmission device for marine motors having a stationary box and a rotatable case therein containing differential gears, an actuating shaft keyed to one of said gears; a propeller shaft with pin receiving orifices in the end thereof, said shaft being in alignment with said actuating shaft and rotatably attached to another of said gears; frictional clutching means slidable upon said driving shaft for operably connecting said case thereto; tooth projections on said case; frictional brake clutch slidably mounted within said box for engaging said case against rotation when said clutch is slid longitudinally of the axis; teeth upon one of said clutch members adapted to engage said tooth projections; slidable teeth upon the other of said clutch members adapted to enter said orifices; and means for alternately sliding said clutches into and out of operable engagement.

11. In a power transmission device for marine motors having a case containing differential gears, a shaft keyed to one of said gears, a second shaft in alignment with said first shaft operably attached to rotate with another of said gears; frictional clutching means for connecting said case rotatably to one of said shafts; positive locking means supplementing said frictional means; and single means for operating both the frictional and positive means.

In testimony whereof I have hereunto set my hand.

WILLIAM C. ESLECK.